United States Patent [19]
Williams

[11] 3,875,370
[45] Apr. 1, 1975

[54] HEAT-RETAINING FOOD SERVICE UNIT

[75] Inventor: Leslie G. Williams, Murfreesboro, Tenn.

[73] Assignee: Standex International Corporation, Murfreesboro, Tenn.

[22] Filed: Mar. 7, 1974

[21] Appl. No.: 448,990

[52] U.S. Cl................. 219/386, 62/3, 126/246, 126/375, 99/447, 165/185, 219/432, 219/433, 219/439, 219/521, 219/530, 219/540
[51] Int. Cl................... F27d 11/02, A47g 23/04
[58] Field of Search.......... 219/385, 386, 387, 430, 219/432, 433, 439, 521, 530, 540; 126/246, 375, 381; 99/447; 62/3, 10, 142; 312/284; 165/185

[56] References Cited
UNITED STATES PATENTS

| 2,152,126 | 3/1939 | Young | 219/460 |
|---|---|---|---|
| 2,215,274 | 9/1940 | Peterson | 62/10 |
| 2,767,563 | 10/1956 | Picascia | 62/142 |
| 2,836,478 | 5/1958 | Miller | 312/284 |
| 2,947,843 | 8/1960 | Burman et al. | 219/420 X |
| 3,019,783 | 2/1962 | Clarke | 126/381 |
| 3,126,882 | 3/1964 | Hilfiker | 126/246 |
| 3,408,481 | 10/1968 | Golden | 219/386 |
| 3,557,774 | 1/1971 | Kreis | 126/246 |
| 3,734,077 | 5/1973 | Murdough et al. | 126/246 |
| 3,837,330 | 9/1974 | Lanigan et al. | 126/246 |

FOREIGN PATENTS OR APPLICATIONS

| 506,667 | 9/1930 | Germany | 219/433 |
|---|---|---|---|
| 761,600 | 11/1956 | United Kingdom | 126/375 |

*Primary Examiner*—Volodymyr Y. Mayewsky
*Attorney, Agent, or Firm*—Henry K. Leonard

[57] ABSTRACT

A heat-retaining hot food service unit which consists of a shaped body of metal, preferably aluminum, that is enclosed in a synthetic resin or plastic jacket which also serves as a base, a food-containing dish and a removable cover. The resin is molded into place around the aluminium body and has a configuration such that the removable food-containing dish nests in the plastic jacket which thus functions as a base for the dish. The removable cover fits over the base and dish, enclosing the edges thereof and defining with the perimeter of the base and the dish, a dead air space for insulating the edge portions of the base and the dish from ambient air. The resinous material has a coefficient of expansion greater than the aluminum body. In one embodiment, there is a resistance heating element embedded in the aluminum and contacts for the heating element extend out of the base for connection to a source of electricity. In another embodiment an elastic expansion joint connects the body and the jacket to provide for variation in expansion of the two while maintaining a sealed connection between them.

8 Claims, 8 Drawing Figures

HEAT-RETAINING FOOD SERVICE UNIT

BACKGROUND OF THE INVENTION

The problems encountered when it is necessary to serve food at a distance, either in time or space, from the place of its original preparation are manifold. This is particularly true where the meals to be served comprise both hot and cold foods. If the entire meal is transported in a heated container, obviously, cold foods, such as salads, bread, butter, ice cream and the like, are spoiled and if the foods are transported in room temperature or cooler containers, the hot foods do not reach the diner in a suitable condition. The problems are particularly acute in large hospitals where the foods are all prepared in a central kitchen but where they are served to patients located in rooms far distant from the kitchen. The same problem exists, for examples, in aircraft, in hotels which have guest cottages or combined units located at distances from the main building, and in similar situations elsewhere.

Many suggestions have been made as to how these problems can be overcome. Among the suggestions has been the provision of food service units each of which comprises a plate for the hot food which either is the upper surface of, or lies nested in, a heat-retaining base which is intended to function to maintain the food at an elevated temperature over a considerable period of time.

Some of these heat-retaining food service units have consisted of slugs or masses of metal such as aluminum surrounded by a plastic or other jacket. Some of them have comprised stainless steel plates having interior hollow spaced filled with heat-retaining material. Some have had insulating jackets for covers. One of the most common devices of this general type is the plastic bowl utilized by some airlines. The bowl is approximately 6 inches by four inches and about 2 inches deep. It is molded from a plastic material and has a plastic top. No provision other than the insulating value of the plastic is provided to keep the food hot.

Additional problems have arisen in connection with the food service units for hot foods, each of which comprises a jacket shaped or formed around a slug of material which has the ability to retain heat. The jacket must be capable of transmitting the heat to the food on its surface or to the food on a plate resting in the jacket, but the unit must have a low rate of heat loss in order to keep hot foods hot as long as possible. In addition, if the heat-retaining material is jacketed by a second material for protection and in order to facilitate handling, the interior material must not expand to a degree greater than the jacket material when the device is heated or the unit explodes.

Preferably a heat-retaining hot food service unit should also include an insulating cover which encloses not only the food contained in the unit, in the nature of a lid, but also should enclose the unit itself in order to minimize the loss of heat to the ambient atmosphere.

It is, therefore, the principal object of the instant invention to provide a heat-retaining food service unit which has a base comprising a heat sink or mass of heat storing material enclosed in a shield or jacket so shaped as to receive in intimate contact a removable food-containing dish as well as a cover which functions not only to protect the food against contamination by airborne materials, but also insulates the food, the dish and the unit itself against heat loss to the atmosphere in order to maintain the food hot as long as possible.

It is another object of the instant invention to provide a heat-retaining food service unit having the foregoing characteristics and which also has a self-contained resistance heating element so that it can be connected to a source of electrical energy and can be used not only to retain heat but also to apply heat to food contained therein, for example, to heat cold or even frozen foods that are initially placed in the unit at a low temperature.

DESCRIPTION OF PREFERRED EMBODIMENTS

Figure 1:
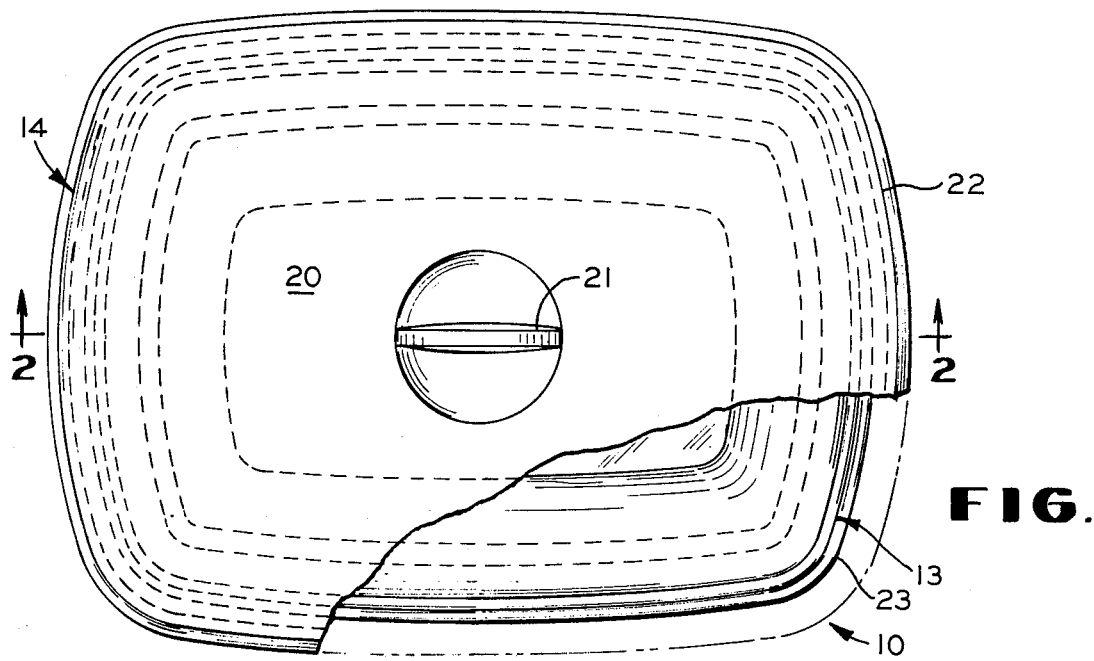
FIG. 1 is a plan view, with parts broken away, of a heat-retaining food service unit embodying the invention.

A heat-retaining hot food service unit embodying the invention is generally indicated by the reference number 10 and consists of a body 11 of heat-retaining material such as aluminum which is enclosed in a molded synthetic resin jacket 12. The jacket 12 serves as a base for the unit. The illustrated unit 10 also includes a food-containing dish 13, for example, made of melamine plastic, china or earthenware, so that it has a proper surface for contact with food and so that it can be sterilized in conventional dishwashing equipment. The unit 10 also comprises a domed, removable cover 14 of interior dimensions such as to totally enclose the jacket 12, the dish 13 and food resting on the dish 13. Preferably the cover 14 is molded from an insulating material such as a conventional polyester.

Figure 2:
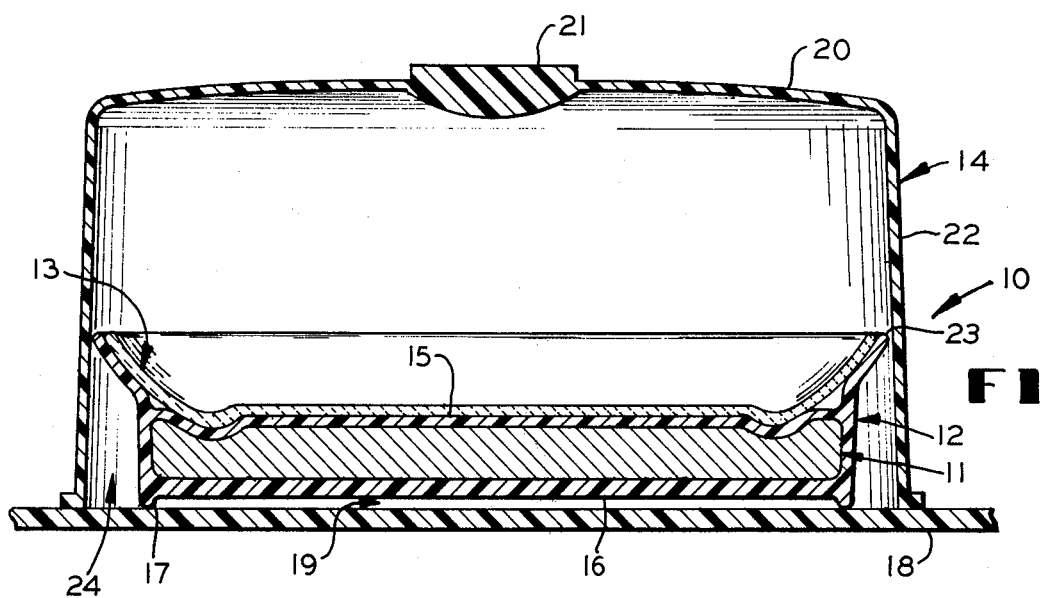
FIG. 2 is a vertical, sectional view taken along the line 2—2 of FIG. 1 and also illustrating how the unit rests on a service tray which is fragmentarily shown.
Figure 4:
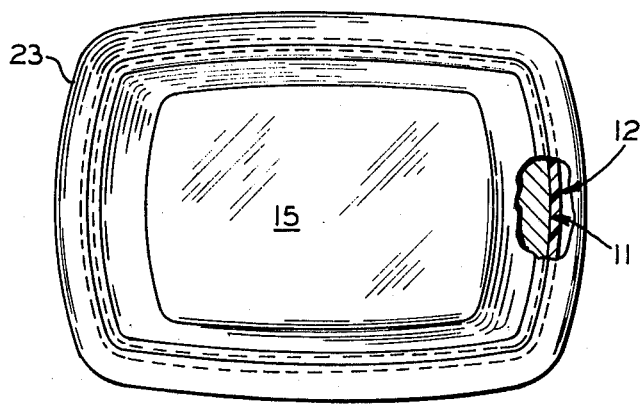
FIG. 4 is a view similar to FIG. 3 but showing the jacket provided for the heat-retaining body and molded to accept a food containing dish.
Figure 3:
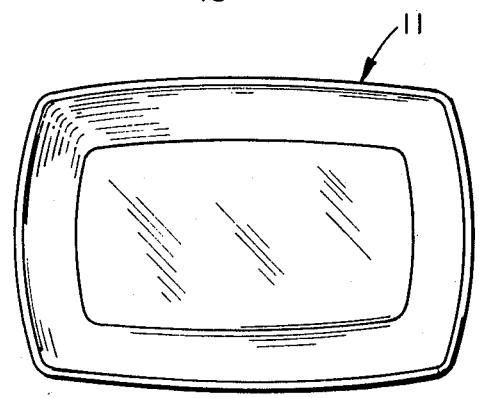
FIG. 3 is a top plan view of the heat-retaining body that is embedded in the base of the unit.

It will be observed in FIG. 2 that the jacket 12 has a top 15 that is thinner in section than its bottom 16 so that heat is more readily transferred from the body 11 to the plate 13 than it is through the bottom 16.

A downwardly extending lip 17 is formed at the perimeter of the bottom 16 to contact the surface of a serving tray fragmentarily illustrated and indicated by the reference number 18 in FIG. 2, or any other surface upon which the unit 10 is to be rested. The lip 17 thus provides for a dead air space, indicated by the reference number 19 in FIG. 2, which assists in preventing transfer of heat from the interior heat-retaining body 11 to the surface upon which the unit is placed, for example, the tray 18.

The top 15 of the jacket 12 has a configuration which is designed to be substantially complementary to the undersurface of the dish 13 thus to assist in heat transfer from the heat-retaining body through the top 15 to the dish 13 and thus to the food in the dish in order to maintain it hot.

The base unit comprising the jacket 12 and heat-retaining body 11 is fabricated by placing the body 11 in the mold for the jacket 12 and molding the jacket 12 around the body 11. Because of the overall surface contact beteen the body 11 and the jacket 12, it is essential that the materials from which the two are made shall be compatible from a standpoint of thermal expansion. For this reason, the body 11 of a unit 10 embodying the invention consists of a mass of aluminum. The coefficient of thermal expansion of aluminum of commercial grade such as that chosen for a unit embodying the invention, is approximately $2.5 \times 10^{-5}$ Unit/Unit Length/°C.

In order to eliminate the possibility that a heat-retaining food service unit embodying invention will explode when the temperature is increased preparatory to its utilization, I have fabricated the jacket 12 from a thermoplastic polyester resin injection molded in place around the aluminum body 11. The particular resin chosen by me is sold by General Electric Co. under the trademark Valox. Such a thermoplastic polyester resin has a coefficient of expansion of approximately $9 \times 10^{-5}$ Unit/Unit Length/°C. Thus, the coefficient of expansion of the jacket 12 is approximately four times as great as the coefficient of expansion for the aluminum body 11. This relationship eliminates the possibility that the internal aluminum body 11 will expand to a degree greater than its jacket 12 and thus destroy the jacket 12 when the unit is being preliminarily heated prior to its utilization.

The cover 14 is of such size and configuration as to fit down over and totally enclose the jacket 12, the plate 13 and has sufficient height so that it also encloses any food served to a diner on the plate 13. Preferably the jacket 13 is also fabricated by molding from a material such as a thermoplastic polyester, for example, the mentioned Valox. The cover 14 has a slightly domed top 20 and a central handle 21, by which it can be lifted as well as a generally vertically extending skirt 22. The skirt 22 is of such interior dimensions as to fit circumjacent the edges of a flared rim 23 of the jacket 12. When the cover 14 is in place resting on the tray 18 or another surface, the lower portion of its skirt 22 defines with the outer surfaces of the jacket 12 an annular air space 24 thereby providing additional insulation against heat loss laterally from the unit. Preferably the skirt 22 is coned to provide sufficient draft in order for a plurality of the covers 14 to be stacked at the central cooking location and/or at the food service location.

It will be appreciated, of course, that while a heat-retaining food service unit embodying the invention, as illustrated in FIGS. 1–4, is shown as being substantially rectangular in plan view (FIGS. 3 and 4) this is merely an arbitrary configuration and units embodying the invention may be circular in shape or square, if preferred, or any other convenient shape to adapt them to the service of food as desired by the establishment employing the unit.

In some systems it is preferable to provide heat-retaining food service units which not only possess the capability of maintaining the food contained therein at a desirable elevated temperature but also have the additional capability of being energized. A modification of a heat-retaining food service unit having this capability is illustrated in FIGS. 5 and 6.

In general, a unit embodying the invention is indicated by the reference number 25 and, as in the earlier embodiment, comprises a heat-retaining body 26. The body 26 is enclosed in a plastic jacket 27 having a configuration similar to the jacket 12 of FIGS. 1–4 and adapted to receive a food service plate (not shown). Again, the body 26 is preferably fabricated from a standard or commercial grade aluminum and the jacket 27 molded from a thermoplastic polyester having a greater coefficient of expansion than the aluminum as explained above. The unit also comprises a dome shaped cover 28.

In this embodiment of the invention, however, the heat-retaining body 26 is molded around and to enclose a resistance heating element, generally indicated by the reference number 29. The heating element 29 is connected laterally through the side of the body 25 and jacket 26 to a pair of conventional connector prongs 30 which protrude therefrom. The prongs 30 may be of such length as to fit within the skirt of the cover 28 as those shown in FIG. 6; or they may be longer than the lateral dimension of a dead air space that is defined by the skirt of the cover 28 and the outer surface of the jacket 27. In the latter case, the cover 28 has a cut-out 32 through which a female plug may be inserted for establishing an electrical circuit to the resistance heater 29.

Figure 5:
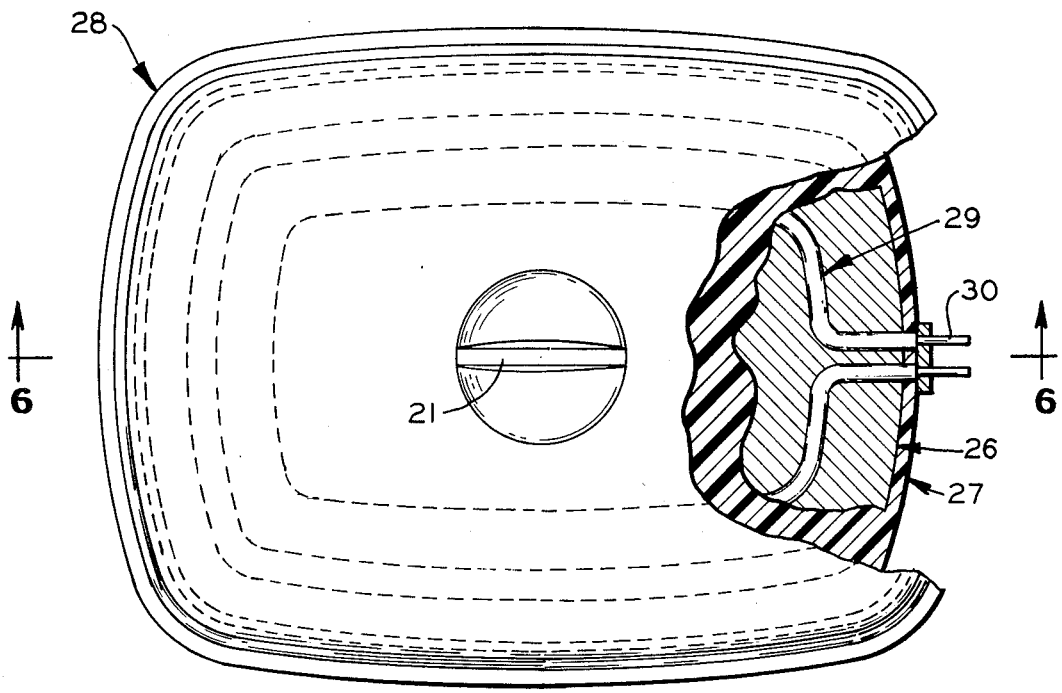
FIG. 5 is a view similar to FIG. 4, shown on an enlarged scale, and illustrating a second embodiment of the invention which comprises a resistance heating coil embedded in the heat-retaining body.
Figure 6:
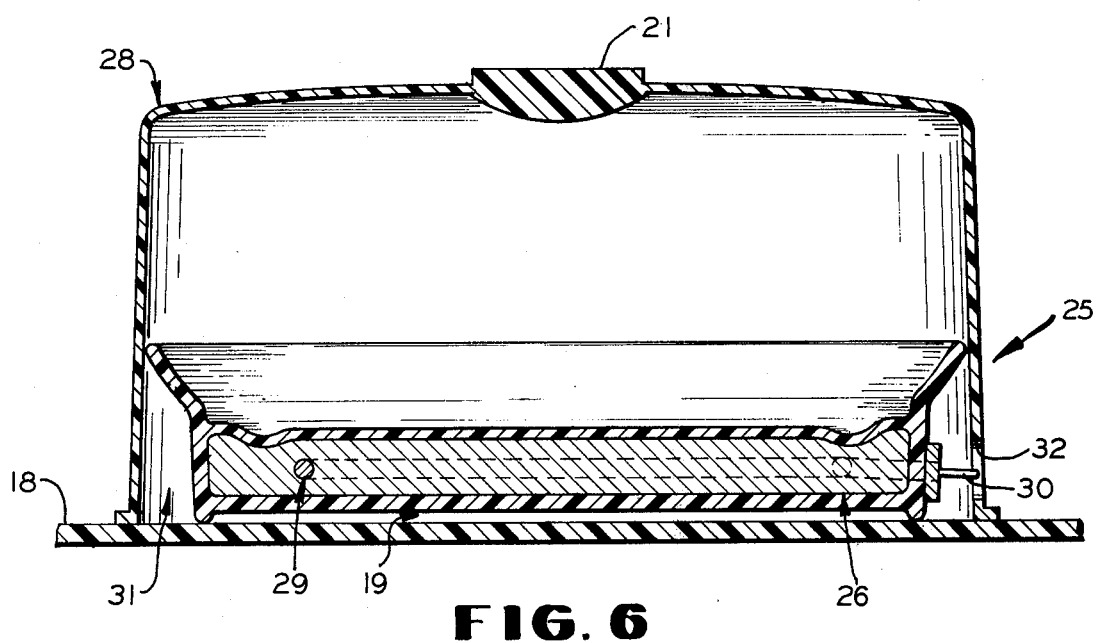
FIG. 6 is a vertical sectional view taken along line 6—6 of FIG. 5 and illustrating how this modification of the invention also can be enclosed in an insulating cover in the same fashion as illustrated in FIG. 2 with respect to the first embodiment of the invention.

The unit 25 of FIGS. 5 and 6 may be used in either of two ways. Conventional food may be kept hot for a period considerably longer than would be possible with the unit 10 of FIGS. 1–4 where desired. In addition, a unit 25 may be employed for the purpose of heating cold or frozen food which is placed in the unit 25 at a central loading station but is not to be served for some time. For example, cold or frozen food may be loaded into units 25 at an airport flight kitchen and the units connected to an aircraft electrical power circuit when it is time to prepare the meal for passenger service.

However, of course, even if a unit such as that illustrated in FIGS. 5 and 6 is employed and upon suitable occasion is connected to a source of electrical energy, the same type of unit also may be used merely as a heat-retaining food service unit in the same fashion as the unit illustrated in FIGS. 1–4 without the necessity for connecting it to a source of electrical energy.

Figure 7:
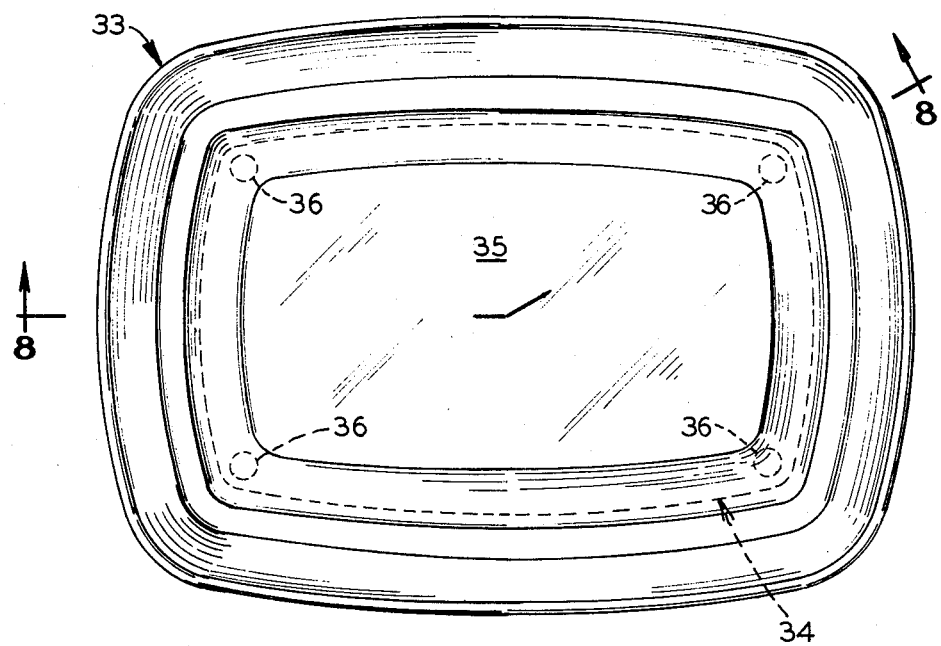
FIGS. 7 and 8 are views similar to FIGS. 5 and 6, respectively, but of a third embodiment of the invention.
Figure 8:
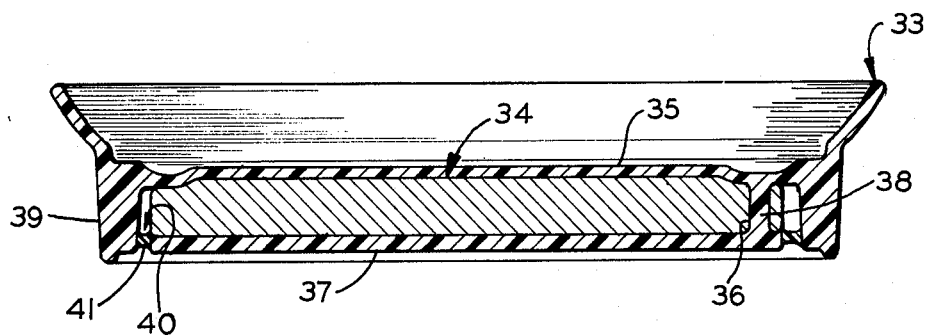

FIGS. 7 and 8 illustrate another embodiment of the invention in which provision is made for even greater expansion of a molded plastic jacket 33 relative to a heat retaining body 34. As in the case of the earlier embodiments, the jacket 33 has a top 35 complementary to a food dish, not shown.

The body 34 in this case has several bores 36, four being shown. The jacket 33 has a bottom 37 which is connected to its top 35 by plastic material 38 which flows through the bores 36 when the jacket is molded around the body 34.

In this case, however, the bottom 37 is not connected to a lower skirt portion 39 of the jacket and an annular space 40 is defined by the periphery of the body 34 and the inner side of the skirt portion 39. An annular mass 41 of an elastic material capable of withstanding the heat applied to the unit, such as a so-called silicon rubber, is filled into the bottom portion of the space 40.

The mass 41 serves to close the space 40 and to allow relative radial movement between the skirt portion 39 and the body 34 serving to additionally protect the jacket 33 against cracking or other damage resulting from thermal expansion or contraction.

Having described my invention, I claim:

1. A heat retaining food service unit, said unit comprising, in combination,
   a. a metallic three-dimensional body fabricated from a material capable of being heated to a temperature in the order of 250°–300°F. without substantial deformation,
   b. a molded plastic jacket and base for said unit, said jacket fitting closely adjacent said body on all sides and having a top surface adapted to receive a food dish,
   c. said jacket being molded in place around said body from a synthetic resin material having a coefficient of thermal expansion greater than the coefficient of expansion of the material out of which said body is fabricated, such synthetic resin being capable of transmitting heat from said body to the top surface of said jacket and to a dish lying thereon,
   d. a hot food dish having a bottom surface complementary to the top surface of said jacket and an upper surface adapted to receive foods, and
   e. a dome shaped cover for said unit, said cover having a closed top and an openended skirt depending from said top, and skirt having a lower edge lying in a plane and a configuration fitting closely circumjacent the perimeter of said dish and said jacket.

2. A unit according to claim 1 in which the body is a mass of commercial grade aluminum and the jacket is molded from a thermoplastic polyester resin.

3. A unit according to claim 1 in which the jacket has a downwardly extending perimeter rib at the edge of its bottom surface for defining a dead air space between the bottom surface of said jacket and a surface upon which said unit is placed.

4. A unit according to claim 1 in which the jacket has an inwardly extending edge surface below its outermost perimeter and said surface defines with the skirt of the cover a dead air space around the edge of said jacket.

5. A unit according to claim 1 and a resistance heating element embedded in said body, said element having electrical connector means protruding outside of said jacket.

6. A unit according to claim 1 in which the jacket has a closed bottom totally enclosing the body.

7. A unit according to claim 1 in which the jacket bottom underlies the body and there is an annular space between the perimeter of said body and the surrounding portion of said jacket, such space being closed by an elastic sealing material.

8. A unit according to claim 7 in which there are bores through the body and the material of the jacket extends through the bores connecting the bottom of the jacket to the top of the jacket.

* * * * *